United States Patent [19]

Kwak

[11] Patent Number: 5,334,248
[45] Date of Patent: Aug. 2, 1994

[54] METHOD FOR CONTROLLING AN AIR CLEANER

[75] Inventor: Byung K. Kwak, Changwon-si, Rep. of Korea

[73] Assignee: Goldstar, Co., Ltd., Seoul, Rep. of Korea

[21] Appl. No.: 970,470

[22] Filed: Nov. 2, 1992

[30] Foreign Application Priority Data

Nov. 2, 1991 [KR] Rep. of Korea .......... 19477/1991

[51] Int. Cl.$^5$ .......................................... B01D 46/46
[52] U.S. Cl. .......................................... 95/12; 95/273
[58] Field of Search .............. 55/18, 210, 270, 271; 95/8, 12, 23, 273

[56] References Cited

U.S. PATENT DOCUMENTS

| | | |
|---|---|---|
| 2,819,774 | 1/1958 | Schmidt et al. .......... 55/210 |
| 3,501,899 | 3/1970 | Allen .......... 55/270 X |
| 4,786,295 | 11/1988 | Newman et al. .......... 55/270 X |
| 4,790,862 | 12/1988 | Naruo et al. .......... 55/210 |
| 4,792,345 | 12/1988 | Abe et al. .......... 55/210 |
| 4,846,850 | 7/1989 | Webb .......... 55/271 X |

FOREIGN PATENT DOCUMENTS

| | | | |
|---|---|---|---|
| 60-181189 | 9/1985 | Japan | 55/18 |
| 62-294797 | 12/1987 | Japan | 55/270 |
| 63-049653 | 3/1988 | Japan | 55/270 |
| 63-229117 | 9/1988 | Japan | 55/270 |
| 63-232818 | 9/1988 | Japan | 55/270 |
| 63-274425 | 11/1988 | Japan | 55/270 |
| 01-007926 | 1/1989 | Japan | 55/270 |
| 02-025646 | 1/1990 | Japan | 55/270 |
| 02-164417 | 6/1990 | Japan | 55/270 |
| 02-303930 | 12/1990 | Japan | 55/18 |
| 03-271020 | 12/1991 | Japan | 55/270 |
| 04-045818 | 2/1992 | Japan | 55/270 |

*Primary Examiner*—Robert Spitzer

[57] ABSTRACT

According to the disclosure the amount of wind for an air cleaner is controlled regardless of the initial value of the air pollution level sensed by a sensor in an air cleaner. This allows the air cleaner to efficiently perform the air cleaning regardless of the area in which the air cleaner is installed. The method for cleaning the air requires that an initial value of the air pollution is sensed. Thereafter, an air pollution grade from a plurality of air pollution grades having a plurality of blow control sections set according to each of the air pollution grades. A present value of the air pollution is then sensed. An increment of air pollution is determined from the initial value of the air pollution and the value of the air pollution sensed at a later time. Based on this increment that has been determined, the amount of air from the air cleaner is controlled depending on that increment.

8 Claims, 13 Drawing Sheets

| membership grades | 0.6 | 0.7 | 0.75 | 0.8 | 0.9 | 1.0 | 1.0 | 1.0 | 0.9 | 0.9 | 0.8 | 0.75 | 0.7 | 0.6 | 0.5 | 0.4 |
|---|---|---|---|---|---|---|---|---|---|---|---|---|---|---|---|---|
| digital values | 0φ ~0F | 1φ ~1F | 2φ ~2F | 3φ ~3F | 4φ ~4F | 5φ ~5F | 6φ ~6F | 7φ ~7F | 8φ ~8F | 9φ ~9F | Aφ ~AF | Bφ ~BF | Cφ ~CF | Dφ ~DF | Eφ ~EF | Fφ ~FF |
| analog values | 0.0 ~-0.3 | 0.3 ~-0.6 | 0.6 ~-0.9 | 0.9 ~-1.3 | 1.3 ~-1.6 | 1.6 ~-1.9 | 1.9 ~-2.2 | 2.2 ~-2.5 | 2.5 ~-2.8 | 2.8 ~-3.1 | 3.1 ~-3.4 | 3.4 ~-3.7 | 3.7 ~-4.0 | 4.0 ~-4.3 | 4.3 ~-4.7 | 4.7 ~-5.0 |
| base Δppm | 1.7 | 1.9 | 2.2 | 2.4 | 2.7 | 3.0 | 3.0 | 3.0 | 2.7 | 2.7 | 2.4 | 2.2 | 1.9 | 1.7 | 1.5 | 1.3 |

METHOD FOR CONTROLLING AN AIR CLEANER

BACKGROUND OF THE INVENTION

1. Field of the Invention

The present invention relates in general to an air cleaner having an air pollution level sensor, and more particularly to a method for controlling the amount of wind for air-cleaning regardless of an initial air pollution level sensed by the air pollution level sensor in the air cleaner.

2. Description of the Prior Art

Figure 1:
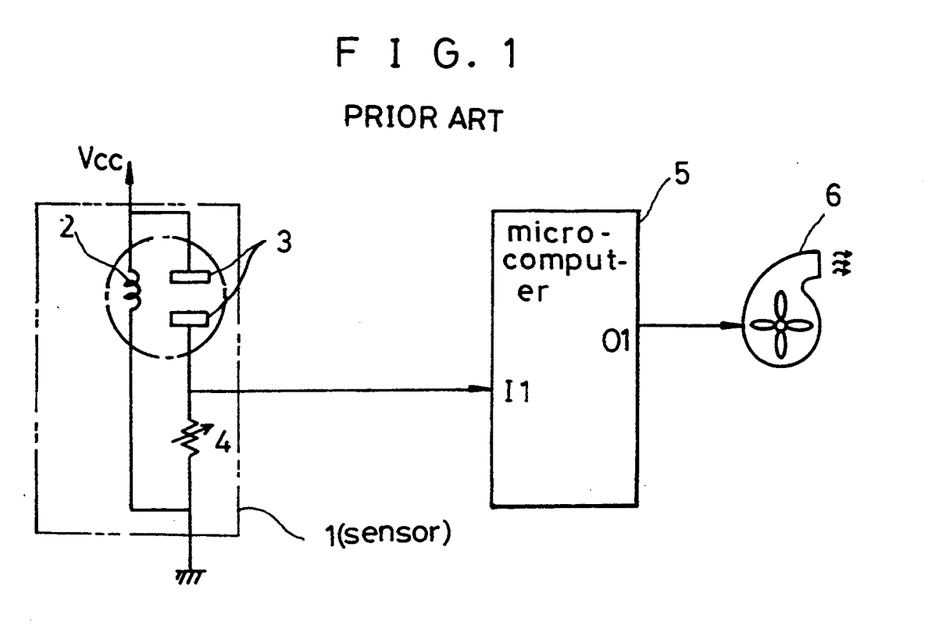
FIG. 1 is a schematic block diagram of a conventional air cleaner.

Referring to FIG. 1, there is shown a schematic block diagram of a conventional air cleaner. As shown in this drawing, the conventional air cleaner comprises a sensor 1 having a heating coil 2, electrodes 3 and a variable resistor 4, for sensing an air pollution level, a microcomputer 5 for outputting a wind amount control signal in response to an output signal from the sensor 1 corresponding to the sensed air pollution level, and a blower 8 for generating a desired amount of wind for the air-cleaning in accordance with the wind amount control signal from the microcomputer 5. The variable resistor 4 functions to adjust sensitivity of the sensor 1.

The operation of the conventional air cleaner with the above-mentioned construction will hereinafter be described.

Upon powering on the air cleaner, the sensor 1 is supplied with a DC voltage Vcc (about +5 V). Then in the sensor 1, the heating coil 2 is heated and a voltage based on the heating of the heating coil 2 appears between the electrodes 3. The variable resistor 4 cooperates with the electrodes 3 to divide the +5 V DC voltage Vcc and applies the divided voltage to the microcomputer 5.

For example, provided that the air pollution level is increased, the voltage between the electrodes 3 drops abruptly and the voltage across the variable resistor 4 rises to the contrary. The increased voltage across the variable resistor 4 is applied to an input terminal I1 of the microcomputer 5. In response to the increased voltage across the variable resistor 4 inputted therein, the microcomputer 5 recognizes that the air pollution level is increased and outputs the wind amount control signal in accordance with the increased air pollution level. As a result, the blower 6 generates a desired amount of wind for the air-cleaning based on the wind amount control signal from the microcomputer 5.

Thereafter, when the air is cleaned and, the air pollution level becomes low, the voltage between the electrodes 3 is increased and the voltage across the variable resistor 4 is reduced to the contrary. The reduced voltage across the variable resistor 4 is applied to the input terminal I1 of the microcomputer 5. In response to the reduced voltage across the variable resistor 4 inputted therein, the microcomputer 5 recognizes that the air pollution level is reduced and outputs the wind amount control signal via output terminal O1 in accordance with the reduced air pollution level. As a result, the blower 6 decreases the amount of wind based on the wind amount control signal from the microcomputer 5.

Figure 2:
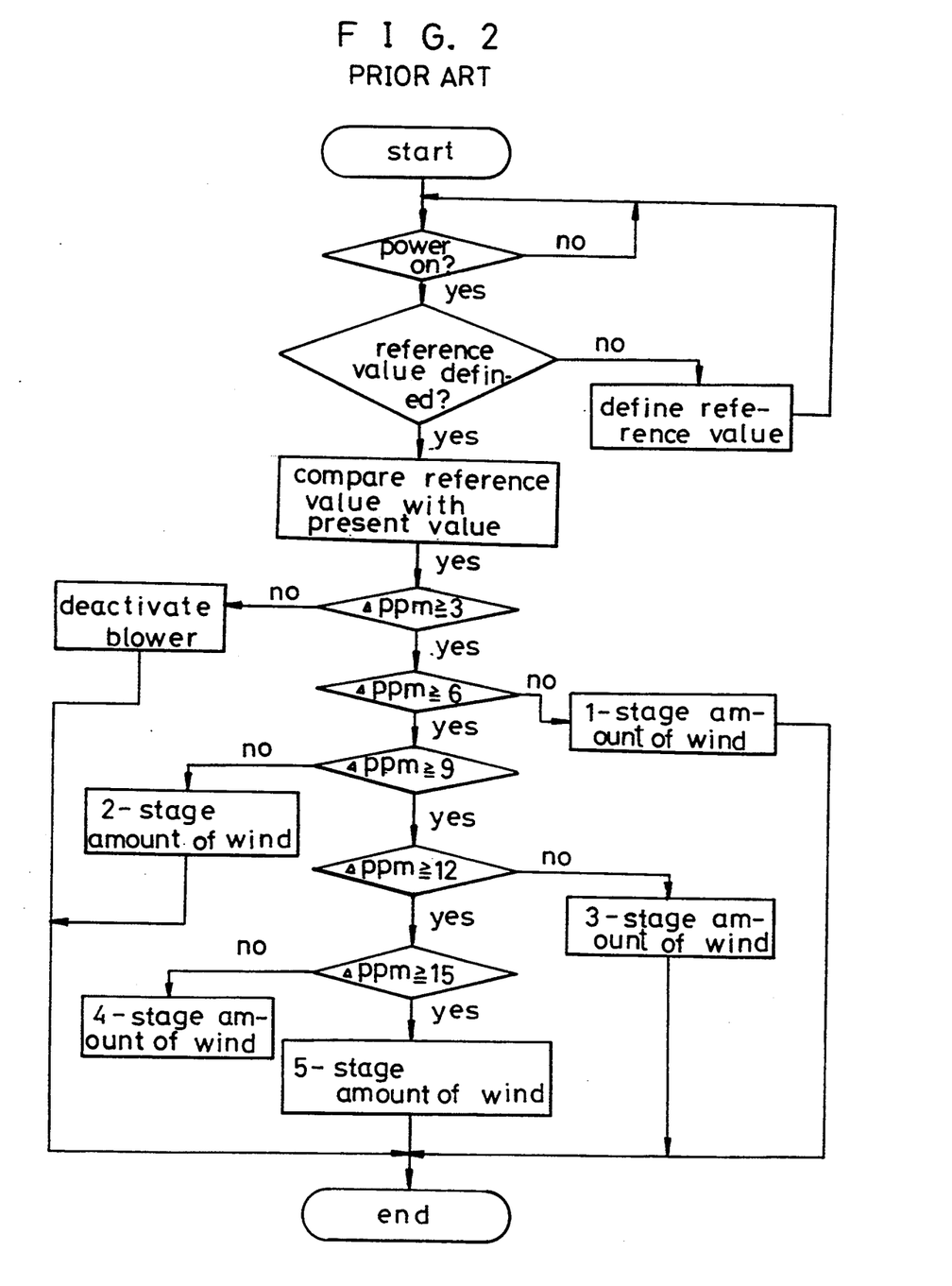
FIG. 2 is a flowchart illustrating a system program stored in a microcomputer in the conventional air cleaner of FIG. 1.

Referring to FIG. 2, there is shown a flowchart illustrating a system program stored in the microcomputer 5 in the conventional air cleaner of FIG. 1. Upon powering on the air cleaner, it is checked whether a reference value of the air pollution level has been defined. If the air cleaner has not been powered on, the system program returns to an initial state. Herein, the reference value means an initial value of the air pollution level sensed by the sensor 1 after powering-on of the air cleaner.

If the reference value of the air pollution level has been defined, the defined reference value of the air pollution level is compared with a present air pollution level being provided by the sensor 1 with the lapse of the time. Obtained in accordance with the compared result is an increment of the air pollution level.

If the reference value of the air pollution level has not been defined, the system program defines an initial value of the air pollution level provided by the sensor 1 as the reference value and then returns to the initial state.

When the increment (referred to hereinafter as $\Delta PPM$) of the air pollution level is smaller than 3, the blower 6 is deactivated. If the $\Delta PPM$ is greater than or equal to 3 and smaller than 6, the blower 6 is activated to generate one-stage amount of wind. If the $\Delta PPM$ is greater than or equal to 6 and smaller than 9, the blower 6 is activated to generate two-stage amount of wind larger than the one-stage amount of wind. If the $\Delta PPM$ is greater than or equal to 9 and smaller than 12, the blower 6 is activated to generate three-stage amount of wind larger than the two-stage amount of wind. Also, if the $\Delta PPM$ is greater than or equal to 12 and smaller than 15, the blower 6 is activated to generate four-stage amount of wind larger than the three-stage amount of wind. Finally, when the $\Delta PPM$ is greater than or equal to 15, the blower 6 is activated to generate five-stage amount of wind as the maximum amount. In this connection, the amount of wind generated by the blower 6 can be defined in the following order:

$$1\text{-stage} < 2\text{-stage} < 3\text{-stage} < 4\text{-stage} < 5\text{-stage} \tag{1}$$

As mentioned above, in the conventional air cleaner, the initial value of the air pollution level sensed by the sensor 1 is defined as the reference value and the increment of the air pollution level is obtained by subtracting the reference value from a present air pollution level being provided by the sensor 1 with the lapse of the time. Then in accordance with the increment of the air pollution level, the blower 6 is activated to generate one of the 1-stage to 5-stage amount of wind. Namely, the more the increment of the air pollution level is, the generated amount of wind is increased.

However, the conventional air cleaner is desirable in the place of relatively low air pollution level such as houses and offices, but has a disadvantage in the place of relatively high air pollution level such as underground shopping arcades, factories and public places crowded with many people. In other words, the relatively high air pollution level has been present in the factory from powering-on of the air cleaner. For this reason, a great amount of wind must be generated just from powering-on of the air cleaner. However, according to the conventional air cleaner, the initial value of the air pollution level sensed by the sensor 1 is defined as the reference value and much amount of wind is not generated until the increment of the air pollution level is considerably large. Moreover, when the increment of the air pollution level is considerably large, the amount of wind will, in fact, be required more for the air-cleaning in the factory than that of wind generated from the air cleaner at that time. That is, in the case where the conventional air cleaner is employed in the place of relatively high air pollution level, it cannot perform an efficient air cleaning because too high value is defined as the reference value.

SUMMARY OF THE INVENTION

Therefore, the present invention has been made in view of the above problem, and it is an object of the present invention to provide a method for cleaning air efficiently regardless of an initial value of an air pollution level in an air cleaner.

In accordance with the present invention, the above object can be accomplished by a provision of a method for cleaning air regardless of initial value of air pollution in an air cleaner, comprising the steps of: a) sensing an initial value of air pollution; b) determining an air pollution grade from a plurality of air pollution grades having a plurality of blow control section set according to each of said air pollution grades; c) sensing a present value of air pollution a certain time later; d) obtaining an air pollution increment from said initial value of air pollution and said present value of air pollution; and e) controlling air blow according to a blow control section covering said air pollution increment of said air pollution grade determined in step b).

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 3:
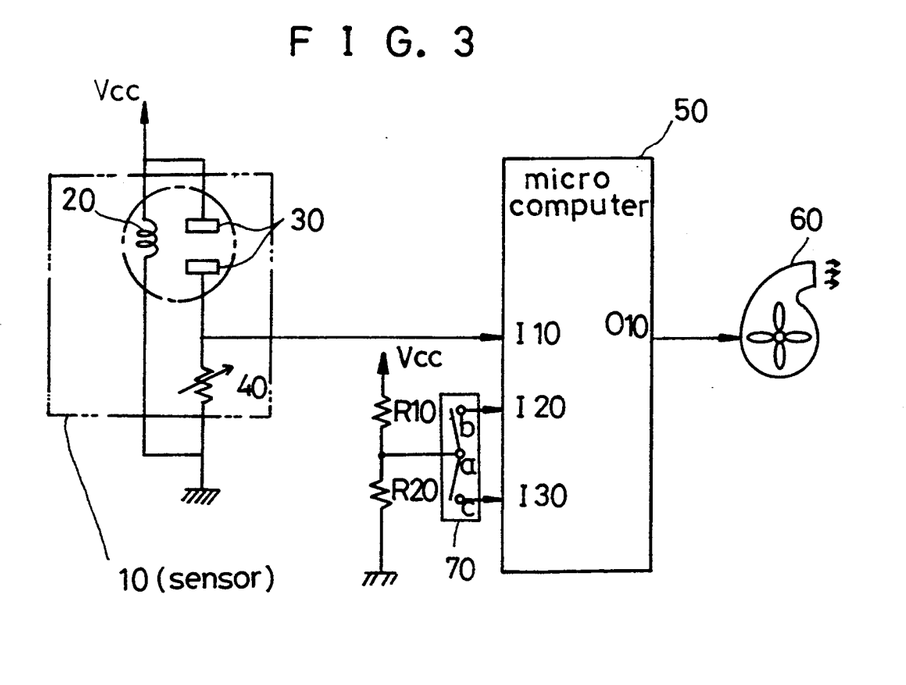
FIG. 3 is a schematic block diagram of an air cleaner in accordance with the present invention.

Referring to FIG. 3, there is shown a schematic block diagram of an air cleaner in accordance with the present invention. As shown in this figure, the air cleaner comprises a sensor 10 having a heating coil 20, electrodes 30 and a variable resistor 40, for sensing an air pollution level, a microcomputer 50 for inputting an output signal from the sensor 10 corresponding to the sensed air pollution level at its input terminal I10 and outputting a wind amount control signal at its output terminal O10 in response to the output signal from the sensor 10, and a blower 60 for generating a desired amount of wind for the air-cleaning in accordance with the wind amount control signal from the microcomputer 50. The variable resistor 40 functions to adjust a sensitivity of the sensor 10.

The air cleaner also comprises a DC voltage source Vcc, a switch 70 having a fixed terminal a and two movable terminals b and c, and two voltage-dividing resistors R10 and R20 for dividing the DC voltage Vcc and feeding the divided voltage to the fixed terminal a of the switch 70. The switch 70, when the air-cleaning cannot be performed by a normal program, acts to provide the voltage applied to its fixed terminal a as a first emergency operation signal for an input terminal I20 of the microcomputer 50 through its movable terminal b or as a second emergency operation signal for an input terminal I30 of the microcomputer 50 through its movable terminal c, according to a user's manual selection.

Now, the operation of the air cleaner with the above-mentioned construction in accordance with the present invention will be described in detail with reference to FIGS. 4 to 6.

Upon powering on the air cleaner, the sensor 10 is supplied with the DC voltage Vcc (about +5 V). Then in the sensor 10, the heating coil 20 is heated and heat thus generated from the heating coil 20 is transferred to the electrodes 30. As a result, a voltage based on the heating of the heating coil 20 appears between the electrodes 30. The variable resistor 40 cooperates with the electrodes 30 to divide the +5V DC voltage Vcc and applies the divided voltage to the microcomputer 50. The microcomputer 50 inputs, as a reference value of the air pollution level, an initial voltage value across the variable resistor 40 after powering-on of the air cleaner, and then continues to input the voltage across the variable resistor 40 corresponding to the sensed air pollution level.

For example, provided that the air pollution level is increased, the voltage between the electrodes 30 drops and the voltage across the variable resistor 40 rises to the contrary. The increased voltage across the variable resistor 40 is applied to the input terminal I10 of the microcomputer 50. In response to the increased voltage across the variable resistor 40 inputted therein, the microcomputer 50 recognizes that the air pollution level is increased and outputs the wind amount control signal in accordance with the increased air pollution level. As a result, the blower 60 increases the amount of wind for the air-cleaning based on the wind amount control signal from the microcomputer 50.

Thereafter, when the air is cleaned and, therefore, the air pollution level becomes low, the voltage between the electrodes 30 is increased and the voltage across the variable resistor 40 is reduced to the contrary. The reduced voltage across the variable resistor 40 is applied to the input terminal I10 of the microcomputer 50. In response to the reduced voltage across the variable resistor 40 inputted therein, the microcomputer 50 recognizes that the air pollution level is reduced and outputs the wind amount control signal in accordance with the reduced air pollution level. As a result, the blower 60 decreases the amount of wind based on the wind amount control signal from the microcomputer 50.

Figure 4:
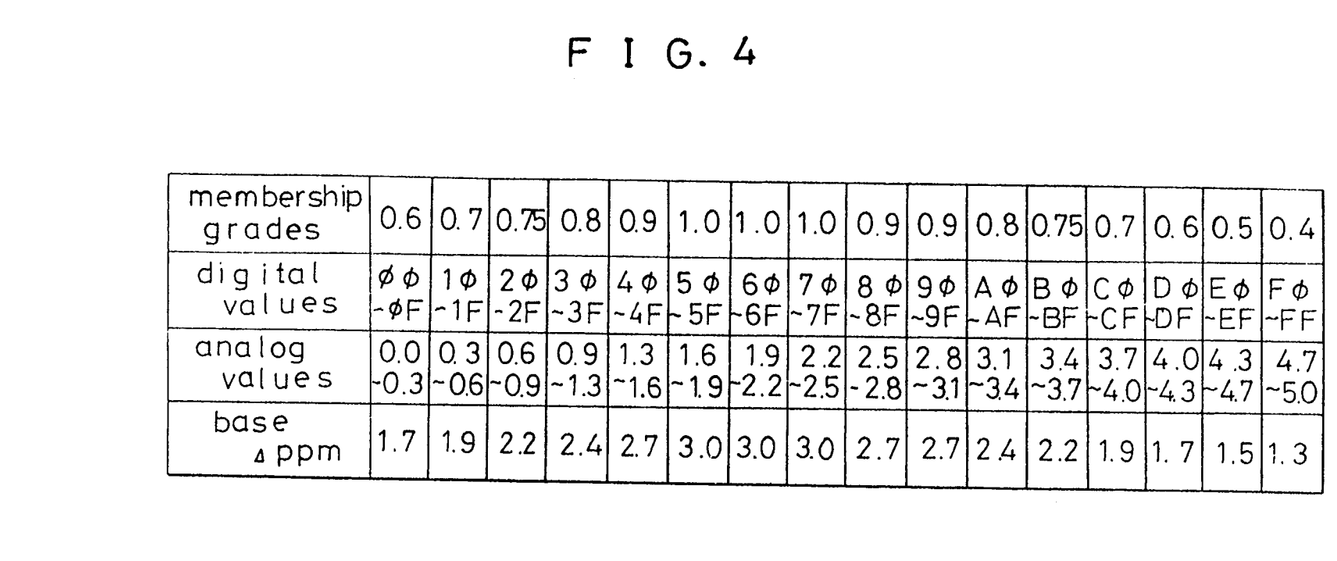
FIG. 4 is a table illustrating a plurality of sections corresponding to a reference value of an air pollution level and a plurality of sections corresponding to an increment of the air pollution level, both the plurality of sections being data pre-stored in a microcomputer in the air cleaner of FIG. 3, in accordance with the present invention.

Referring to FIG. 4, there is shown a table illustrating a plurality of sections corresponding to a reference value of the air pollution level and a plurality of sections corresponding to an increment of the air pollution level, both the plurality of sections being data pre-stored in the microcomputer 50, in accordance with the present invention. In FIG. 4, membership grades are provided for a signal process based on the air pollution level. The plurality of sections corresponding to the reference value of the air pollution level are represented as digital values and analog values. Also, a base ΔPPM represent a base increment of the air pollution level corresponding to each of the membership grades. The use of the data in FIG. 4 will hereinafter be described in detail with reference to FIG. 5.

Referring to FIGS. 5A to 5H, there are shown flowcharts illustrating a system program corresponding to a normal operation of the air cleaner, which is stored in the microcomputer 50, in accordance with the present invention. First, the system program checks whether the air cleaner has been powered on. If the air cleaner has been powered on, it is checked whether a reference value of the air pollution level (i.e., an initial value of the air pollution level sensed through the sensor 10) has been defined. If the air cleaner has not been powered on, the system program returns to an initial state. On the other hand, if the reference value of the air pollution level has not been defined, the system program defines, as the reference value, an initial value of the air pollution level from the sensor 10 inputted at the input terminal I10 of the microcomputer 50 and then returns to the initial state.

Figure 5A:
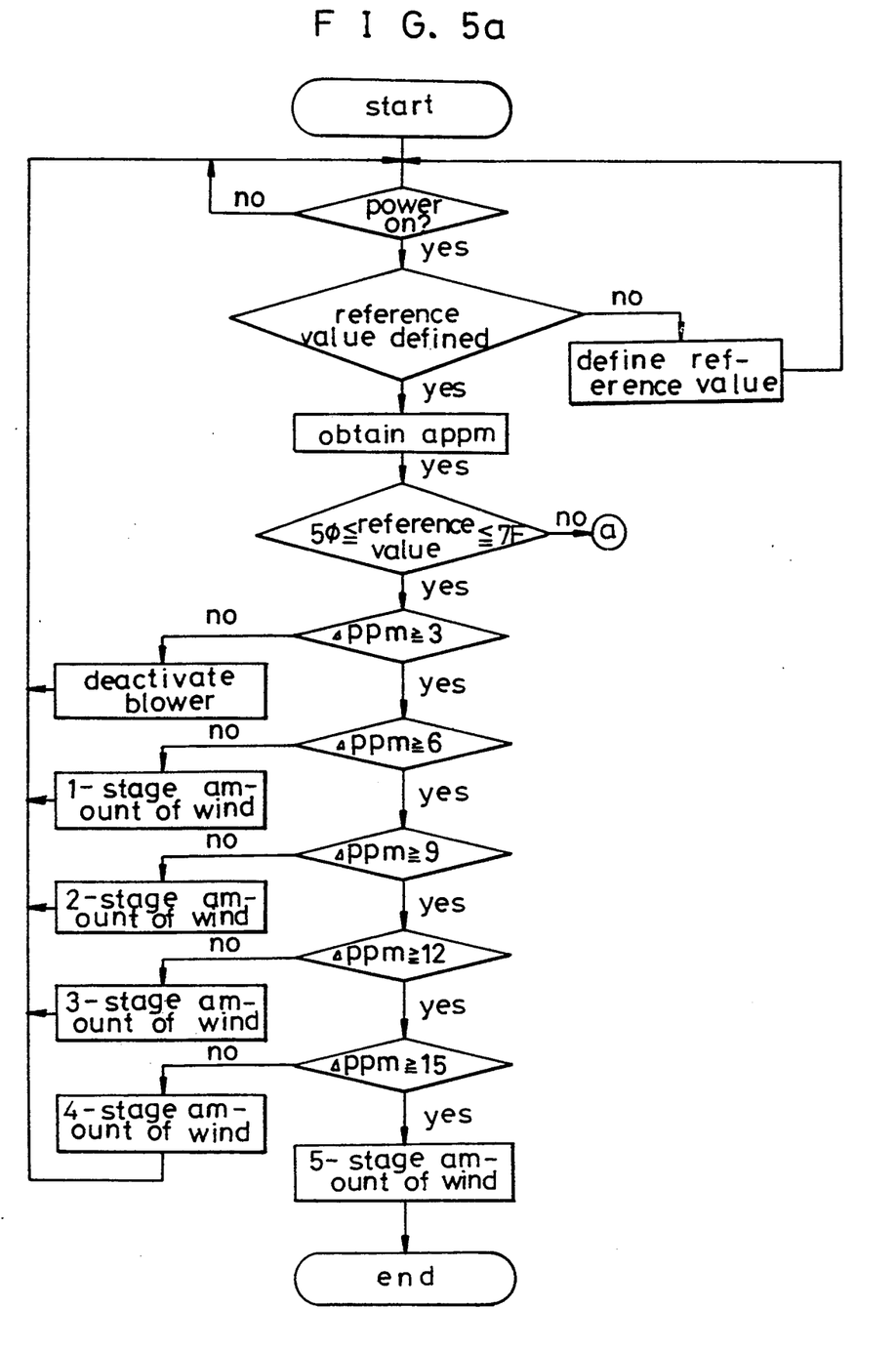
FIGS. 5A to 5H are flowcharts illustrating a system program corresponding to a normal operation of the air cleaner, which is stored in the microcomputer, in accordance with the present invention.

Thereafter, the system program checks whether the defined reference value belongs to any one of 16 sections shown in FIG. 4. First as shown in FIG. 5A, provided that the reference value belongs to the sections of the membership grade 1 [i.e., 50–5F(1.6 V–1.9 V), 60–6F (1.9 V–2.2 V) and 70–7F (2.2 V–2.5 V)], an increment (ΔPPM) of the air pollution level is compared with the base ΔPPM 3. Herein, the ΔPPM is obtained by subtracting the reference value from a present air pollution level being provided by the sensor 10 with the lapse of the time.

When the ΔPPM is smaller than the base ΔPPM 3 in the membership grade 1, the system program deactivates the blower 60 and then returns to the initial state. If the ΔPPM is greater than or equal to 3 and smaller than 6, the blower 60 is activated to generate one-stage amount of wind. If the ΔPPM is greater than or equal to 6 and smaller than 9, the blower 60 is activated to generate two-stage amount of wind larger than the one-stage amount of wind. If the ΔPPM is greater than or equal to 9 and smaller than 12, the blower 60 is activated to generate three-stage amount of wind larger than the two-stage amount of wind. Also, if the ΔPPM is greater than or equal to 12 and smaller than 15, the blower 60 is activated to generate four-stage amount of wind larger than the three-stage amount of wind. Finally, when the ΔPPM is greater than or equal to 15, the blower 60 is activated to generate five-stage amount of wind as the maximum amount.

In other words, in FIG. 5A, when the reference value belongs to the sections of the membership grade 1, it is checked whether the ΔPPM belongs to any one of a plurality of sections, each formed between adjacent ones of multiples of the base ΔPPM 3, and the amount of wind for the air-cleaning is controlled in accordance with the checked result.

Figure 5B:
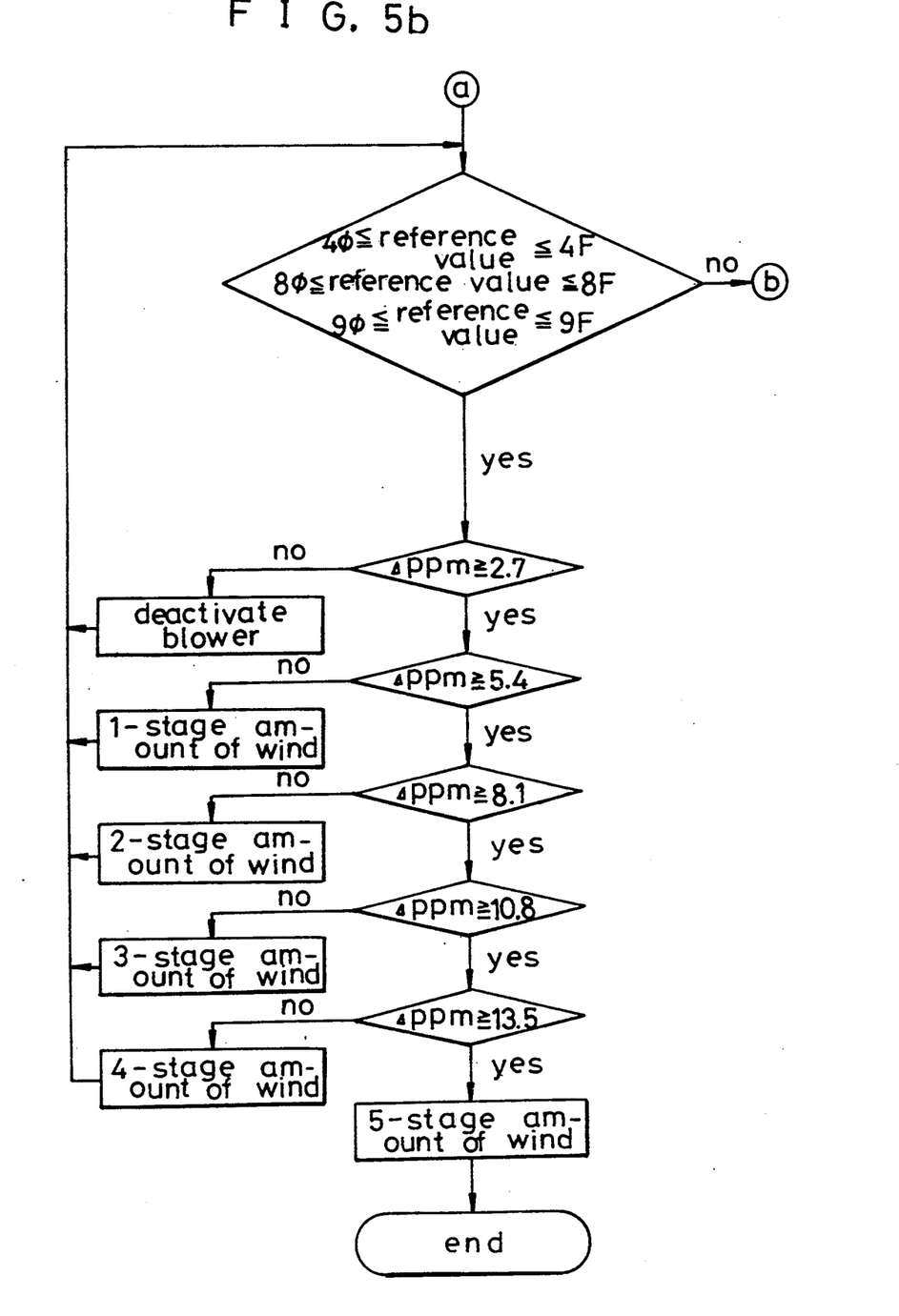

On the other hand, as shown in FIG. 5B, provided that the reference value belongs to the sections of the membership grade 0.9 [i.e., 40–4F (1.3 V–1.6 V), 80–8F (2.5 V–2.8 V) and 90–9F (2.8 V–3.1 V)], the increment ΔPPM of the air pollution level is compared with the base ΔPPM 2.7.

When the ΔPPM is smaller than the base ΔPPM 2.7 in the membership grade 0.9, the system program deactivates the blower 60 and then returns to the initial state. If the ΔPPM is greater than or equal to 2.7 and smaller than 5.4, the blower 60 is activated to generate the one-stage amount of wind. If the ΔPPM is greater than or equal to 5.4 and smaller than 8.1, the blower 60 is activated to generate the two-stage amount of wind larger than the one-stage amount of wind. If the ΔPPM is greater than or equal to 8.1 and smaller than 10.8, the blower 60 is activated to generate the three-stage amount of wind larger than the two-stage amount of wind. Also, if the ΔPPM is greater than or equal to 10.8 and smaller than 13.5, the blower 60 is activated to generate the four-stage amount of wind larger than the three-stage amount of wind. Finally, when the ΔPPM is greater than or equal to 13.5, the blower 60 is activated to generate the five-stage amount of wind as the maximum amount.

In other words, in FIG. 5B, when the reference value belongs to the sections of the membership grade 0.9, it is checked whether the ΔPPM belongs to any one of a plurality of sections, each formed between adjacent ones of multiples of the base ΔPPM 2.7, and the amount of wind for the air-cleaning is controlled in accordance with the checked result.

Figure 5C:
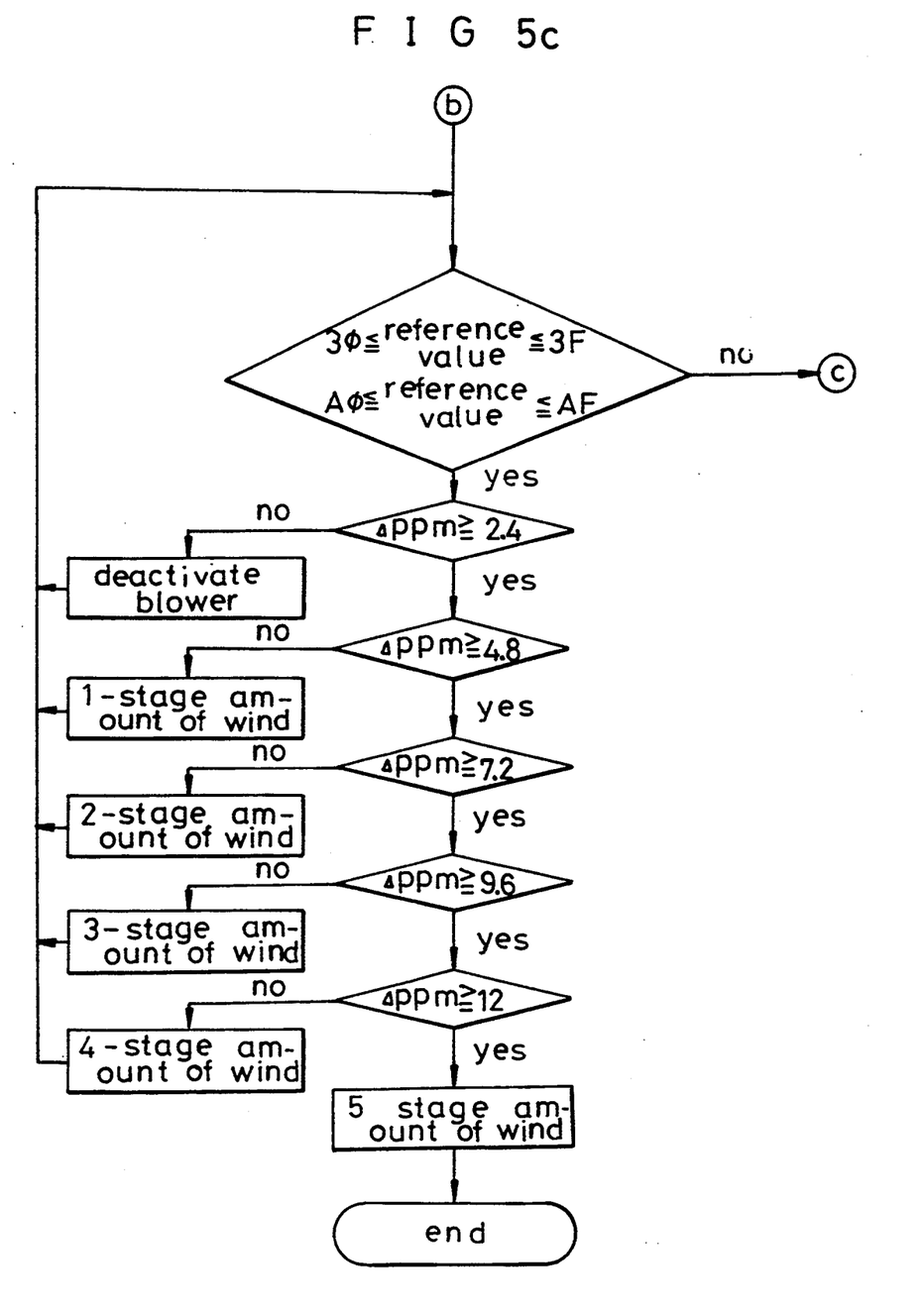
Figure 5D:
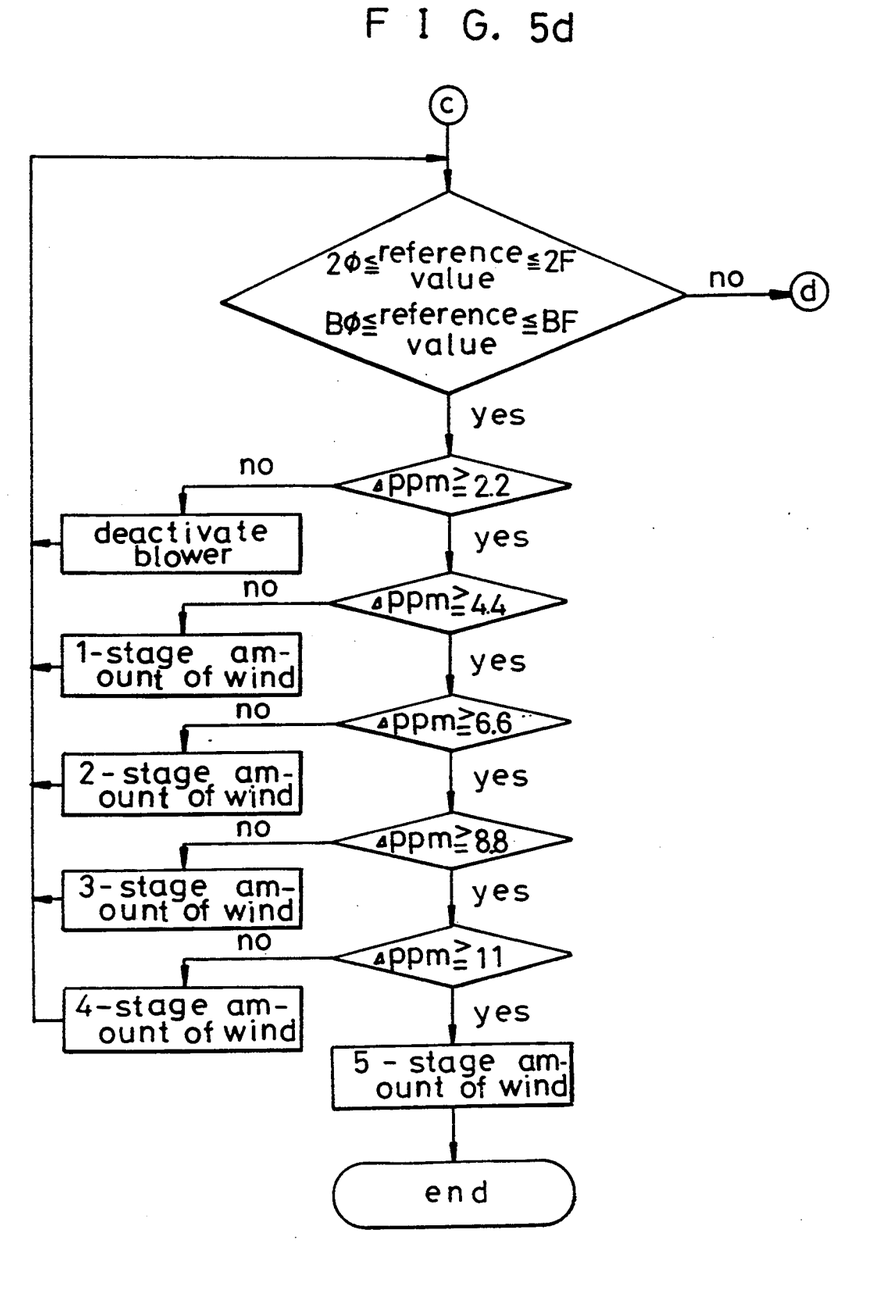
Figure 5E:
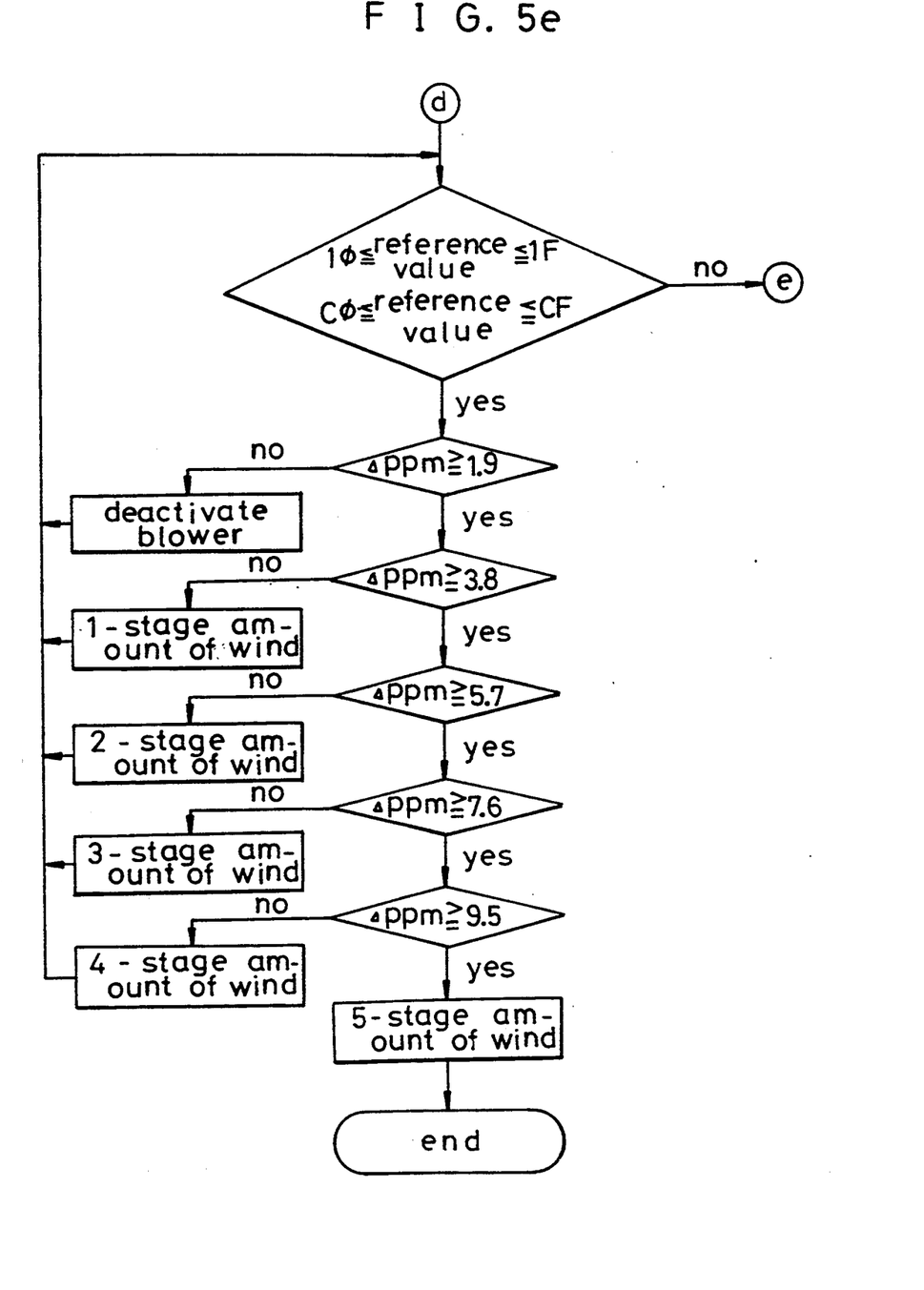
Figure 5F:
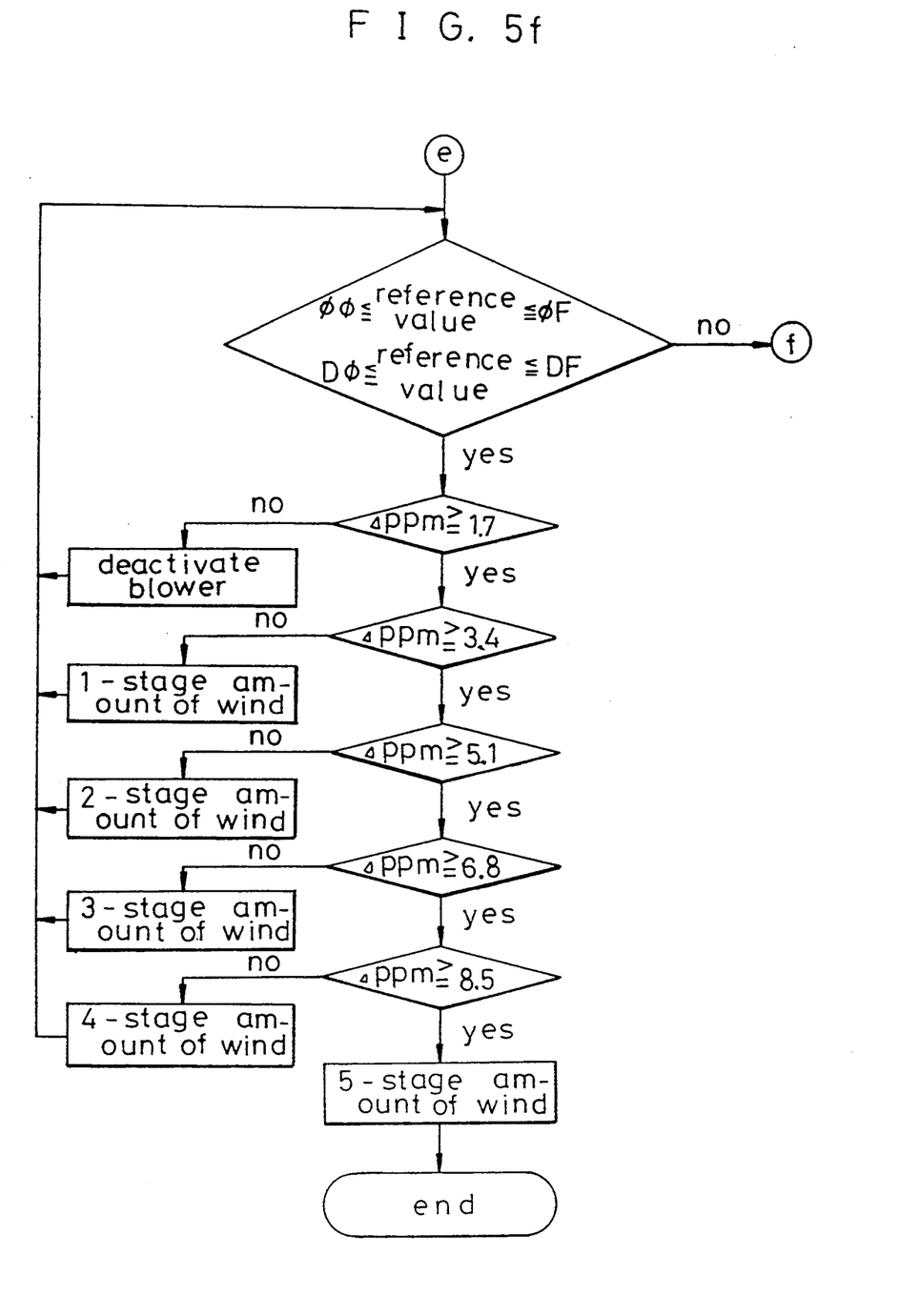
Figure 5G:
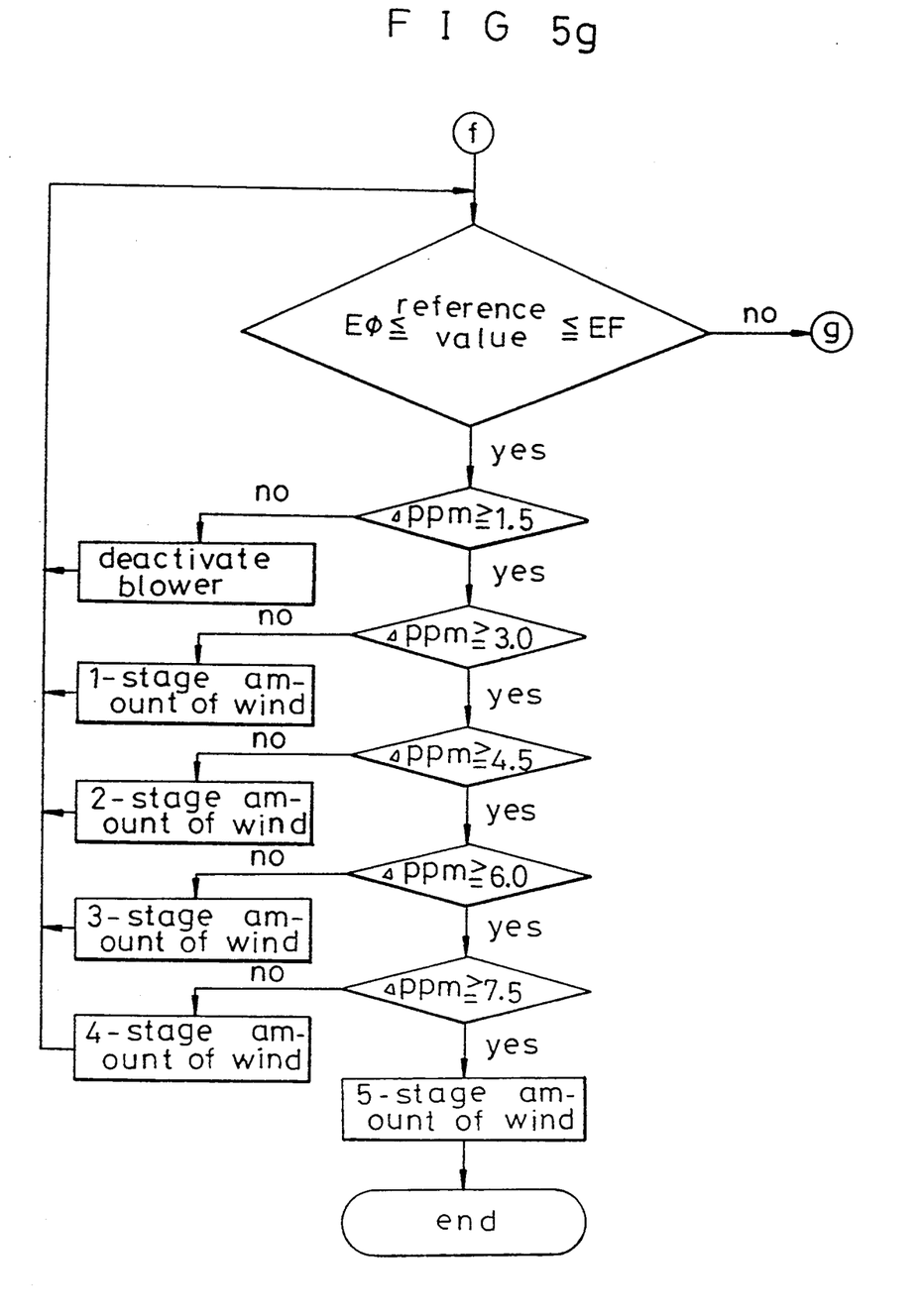
Figure 5H:
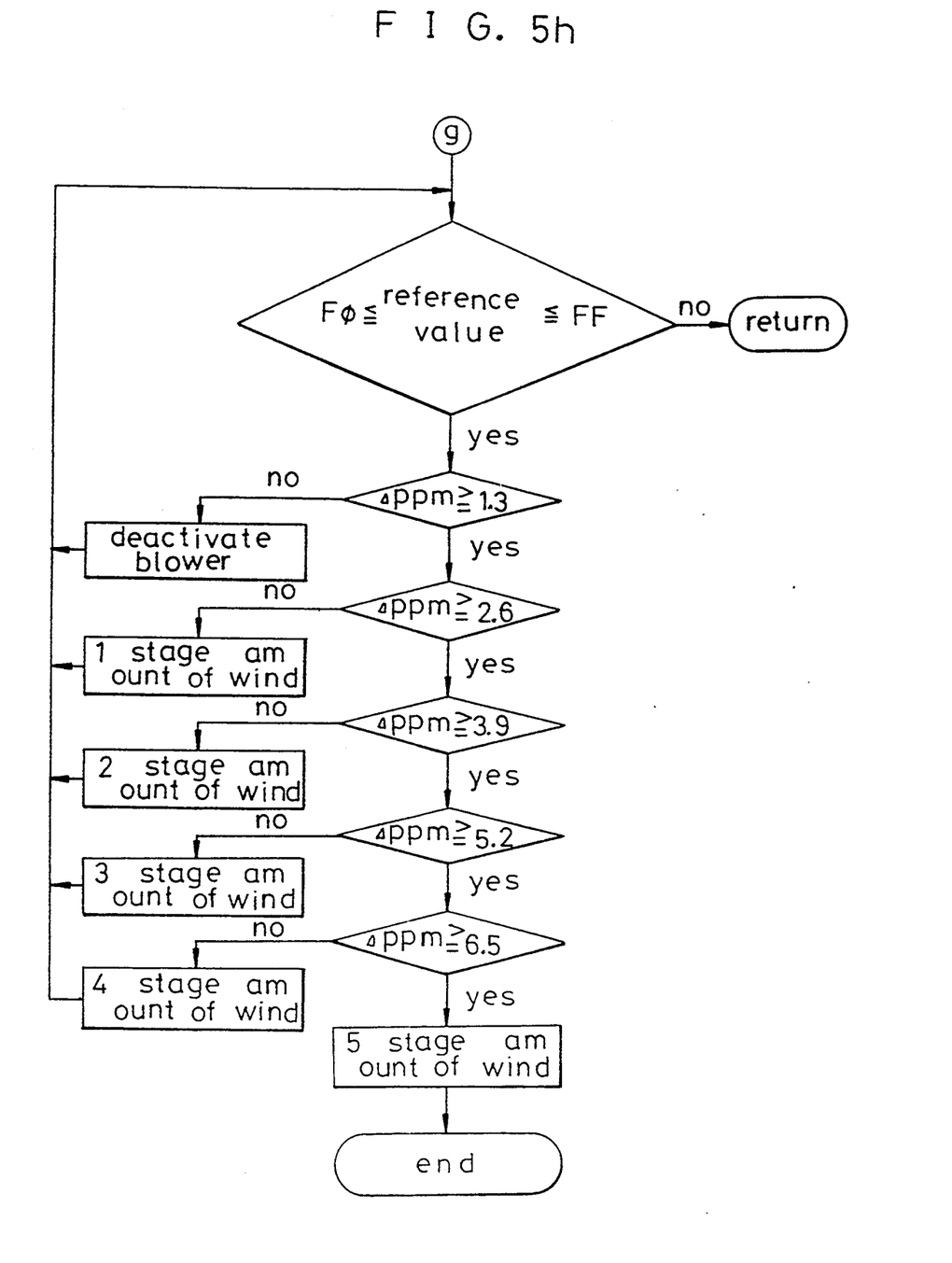

FIG. 5C illustrates a wind amount control operation in the sections of the membership grade 0.8, FIG. 5D illustrates a wind amount control operation in the sections of the membership grade 0.75, FIG. 5E illustrates a wind amount control operation in the sections of the membership grade 0.7, FIG. 5F illustrates a wind amount control operation in the sections of the membership grade 0.6, FIG. 5G illustrates a wind amount control operation in the sections of the membership grade 0.5, and FIG. 5H illustrates a wind amount control operation in the sections of the membership grade 0.4. The table in FIG. 4 is preset in manufacturing the air cleaner and various modifications thereof are possible. The procedures of FIGS. 5C to 5H are the same as those of FIGS. 5A and 5B as mentioned above and thus a description thereof will be omitted.

As stated previously, it can be seen from FIGS. 5A to 5H that the air cleaner can perform the air-cleaning at the optimum condition since the control of the wind amount is carried out differently in accordance with a degree to which the initial value of the air pollution level from the sensor 10 applied as the reference value to the microcomputer 50 corresponds.

Figure 6:
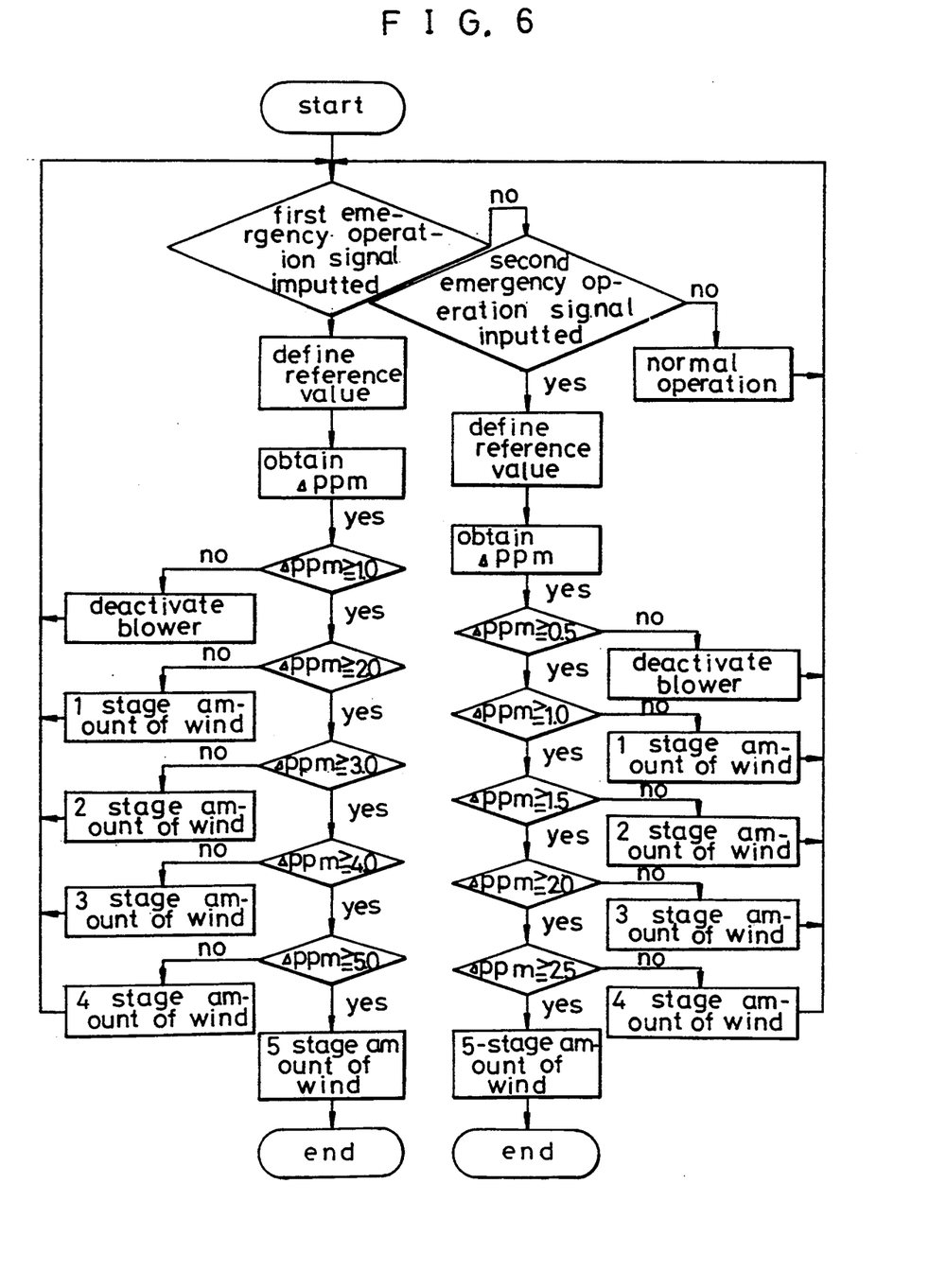
FIG. 6 is a flowchart illustrating a system program corresponding to an emergency operation of the air cleaner, which is stored in the microcomputer, in accordance with the present invention.

Referring to FIG. 6, there is shown a flowchart illustrating a system program corresponding to an emergency operation of the air cleaner, which is stored in the microcomputer 50, in accordance with the present invention. For example, provided that the air cleaner is installed in the place of relatively high air pollution level such as underground shopping arcades, factories and public places crowded with many people, the user will recognize that the air-cleaning cannot be performed only with the system program in FIG. 5.

The switch 70 in FIG. 3 acts to provide the first or second emergency operation signal for the microcomputer 50 according to a user's manual selection. Namely, if the user operates the switch 70 to connect the fixed terminal a of the switch 70 to the movable terminal b thereof, a desired voltage divided by the resistors R10 and R20 is applied through the switch 70 as the first emergency operation signal to the input terminal I20 of the microcomputer 50. At this time, the system program defines, as a reference value, an initial value of the air pollution level from the sensor 10 inputted at the input terminal I10 of the microcomputer 50 and then obtains an increment (ΔPPM) of the air pollution level by subtracting the reference value from a present air pollution level from the sensor 10 inputted at the input terminal I10 of the microcomputer 50 with the lapse of the time.

When the ΔPPM is smaller than the base ΔPPM 1, the system program deactivates the blower 60 and then returns to the initial state. If the ΔPPM is greater than or equal to 1 and smaller than 2, the blower 60 is activated to generate the one-stage amount of wind. If the ΔPPM is greater than or equal to 2 and smaller than 3, the blower 60 is activated to generate the two-stage amount of wind larger than the one-stage amount of wind. If the ΔPPM is greater than or equal to 3 and smaller than 4, the blower 60 is activated to generate the three-stage amount of wind larger than the two-stage amount of wind. Also, if the ΔPPM is greater than or equal to 4 and smaller than 5, the blower 60 is activated to generate the four-stage amount of wind larger than the three-stage amount of wind. Finally, when the ΔPPM is greater than equal to 5, the blower 60 is activated to generate the five-stage amount of wind as the maximum amount.

In other words, it is checked whether the ΔPPM belongs to any one of a plurality of sections, each formed between adjacent ones of multiples of the base ΔPPM 1, and the amount of wind for the air-cleaning is controlled in accordance with the checked result.

On the other hand, if the user operates the switch 70 to connect the fixed terminal a of the switch 70 to the movable terminal c thereof, the desired voltage divided by the resistors R10 and R20 is applied through the switch 70 as the second emergency operation signal to the input terminal I30 of the microcomputer 50. At this time, the system program defines, as a reference value, an initial value of the air pollution level from the sensor 10 inputted at the input terminal I10 of the microcomputer 50 and then obtains an increment (ΔPPM) of the air pollution level by subtracting the reference value from a present air pollution level from the sensor 10 inputted at the input terminal I10 of the microcomputer 50 with the lapse of the time.

When the ΔPPM is smaller than the base ΔPPM 0.5, the system program deactivates the blower 60 and then returns to the initial state. If the ΔPPM is greater than or equal to 0.5 and smaller than 1, the blower 60 is activated to generate the one-stage amount of wind. If the ΔPPM is greater than or equal to 1 and smaller than 1.5, the blower 60 is activated to generate the two-stage amount of wind larger than the one-stage amount of wind. If the ΔPPM is greater than or equal to 1.5 and smaller than 2, the blower 60 is activated to generate the three-stage amount of wind larger than the two-stage amount of wind. Also, if the ΔPPM is greater than or equal to 2 and smaller than 2.5, the blower 60 is activated to generate the four-stage amount of wind larger than the three-stage amount of wind. Finally, when the ΔPPM is greater than or equal to 2.5, the blower 60 is activated to generate the five-stage amount of wind as the maximum amount.

In other words, it is checked whether the ΔPPM belongs to any one of a plurality of sections, each formed between adjacent ones of multiples of the base ΔPPM 0.5, and the amount of wind for the air-cleaning is controlled in accordance with the checked result.

On the other hand, if the fixed terminal a of the switch 70 is not connected to any one of the movable terminals b and c thereof, the air cleaner is operated based on the normal program as shown in FIGS. 5A to 5H.

As hereinbefore described, according to the present invention, the amount of wind for the air-cleaning in the air cleaner is controlled regardless of the initial value of the air pollution level sensed by the sensor in the air cleaner, thereby allowing the air cleaner to efficiently perform the air-cleaning regardless of the place in which the air cleaner is installed. Moreover, in the case where the air cleaner is installed in the place of relatively high air pollution level, the air cleaner performs the emergency operation to generate the large amount of wind for the air-cleaning even in a small variation of the air pollution level. This also enables the efficient air-cleaning of the air cleaner regardless of the place in which the air cleaner is installed.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A method for cleaning air regardless of initial value of air pollution in an air cleaner, comprising the steps performed in sequence of:
   a) sensing at a first time an initial value of air pollution and obtaining a first air pollution increment when the air cleaner is first powered on;
   b) sensing a present value of air pollution a certain time later than said first time and obtaining a second air pollution increment;
   c) obtaining a third air pollution increment from said initial value of air pollution and said present value of air pollution by subtracting said first air pollution increment from said second air pollution increment;
   d) determining an air pollution grade from a plurality of air pollution grades having a plurality of blow control section set according to each of said air pollution grades by use of the third air pollution increment; and
   e) controlling air blow according to a blow control section covering said third air pollution increment of said air pollution grade determined in step d).

2. A method for cleaning air as claimed in claim 1, wherein said plurality of blow control section comprises a base increment of air pollution inherently pre-set according to each of said air pollution grades and at least one multiple of said base increment.

3. A method for cleaning air as claimed in claim 2, wherein a base increment of an air pollution grade of higher initial value of air pollution is lower than a base increment of an air pollution grade of lower air pollution.

4. A method for cleaning air as claimed in claim 1, further comprising a step of varying an interval between said blow control sections in response to a user's manual selection.

5. A method for cleaning air regardless of initial value of air pollution in an air cleaner, comprising the steps of:
   a) sensing at a first time an initial value of air pollution and obtaining a first air pollution increment when the air cleaner is powered on;

b) determining a base increment of air pollution according to said initial value;
c) sensing a present value of air pollution a certain time later than said first time and obtaining a second air pollution increment;
d) obtaining a third air pollution increment from said initial value of air pollution and said present value of air pollution first by subtracting said first air pollution increment from said second air pollution increment;
e) comparing said third air pollution increment with said base increment and at least one multiple of said base increment; and
f) controlling an amount of air blow in accordance with the comparison performed in step e).

6. A method for cleaning air as claimed in claim 5, wherein said base increment is determined lower as said initial value is sensed higher.

7. A method for cleaning air as claimed in claim 5, further comprising a step of varying a value for said base increment in response to a user's manual selection.

8. A method for cleaning air independent of an initial value of air pollution in an air cleaner, comprising the steps of:
(a) manually activating a switch to provide a preselected voltage as an emergency operation signal to a microcomputer;
(b) sensing at a first time an initial value of air pollution and obtaining a first air pollution increment when the air cleaner is first powered on;
(c) sensing a present value of air pollution at a time after step (b) which is a time later than said first time and obtaining a second air pollution increment;
(d) obtaining a third air pollution increment from said first air pollution and said second air pollution increments by subtracting said first air pollution increment from said second air pollution increment; and
(e) operating a blower in an air cleaner that can generate different amounts of wind, the different amounts of wind dependent on the third air pollution increment obtained in step (d).

* * * * *